Oct. 26, 1926.

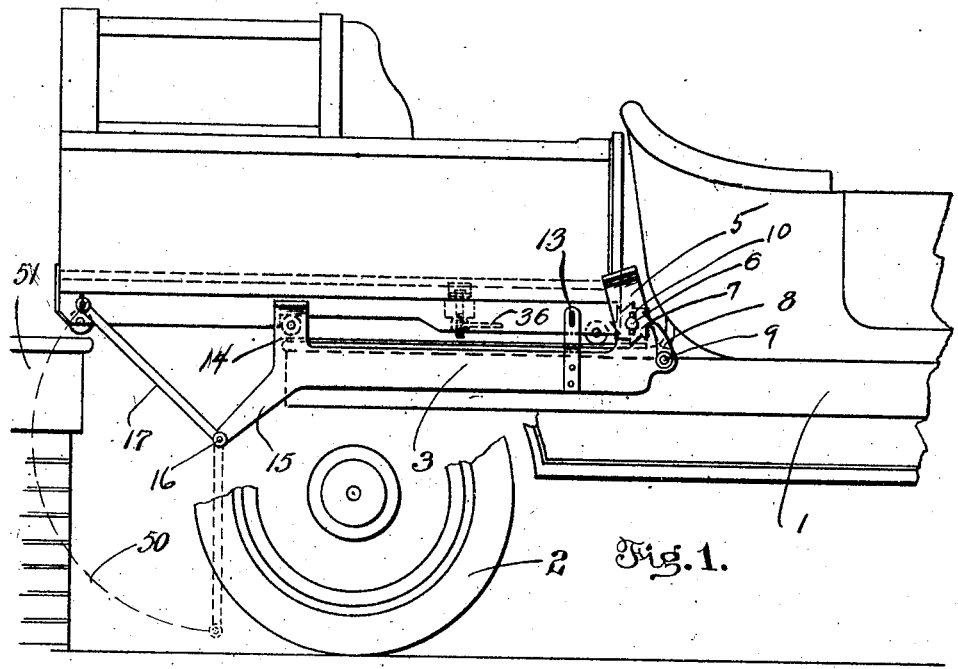
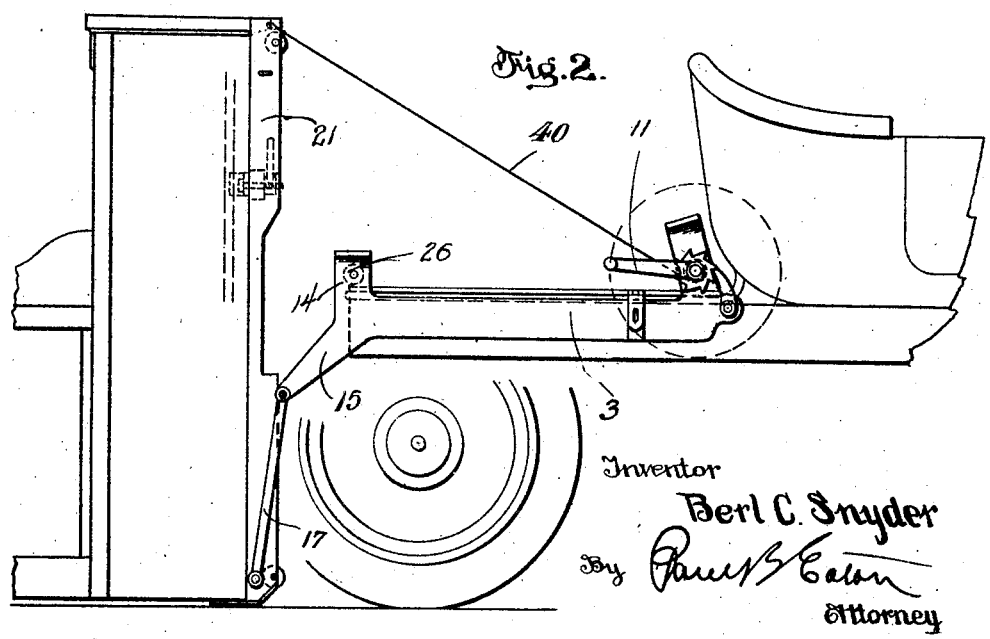

B. C. SNYDER 1,604,494

LOADING AND UNLOADING DEVICE

Filed March 28, 1925　　2 Sheets-Sheet 2

Inventor
Berl C. Snyder
By Paul B. Eaton
Attorney

Patented Oct. 26, 1926.

1,604,494

UNITED STATES PATENT OFFICE.

BERL C. SNYDER, OF WINSTON-SALEM, NORTH CAROLINA.

LOADING AND UNLOADING DEVICE.

Application filed March 28, 1925. Serial No. 19,098.

My invention relates to loading and unloading devices, and more particularly to a device for loading and unloading pianos and other similar musical instruments.

Another object of my invention is to provide a loading and unloading device which is so constructed as to allow the object transported by the device to be unloaded at a much higher level than has heretofore been done by devices of this nature.

Another object of invention is to provide means to be attached to an automobile for loading and unloading pianos and other articles, said means so arranged as to load and unload at a much higher level than has heretofore been accomplished by devices of this character.

Having thus stated some of the objects of my invention, a brief description of the different figures in the drawings will now be given.

Figure 1 is a side elevation of my device, showing it attached to the rear portion of an automobile, with parts of the automobile being broken away, and showing the device with a piano loaded thereon in transport position;

Figure 2 is a side elevation of my device, showing the piano in unloaded position;

Having thus briefly described the different figures in the drawings, a detailed description of the drawings will now be given in which like reference characters indicate corresponding parts thruout the drawings.

Figure 3:
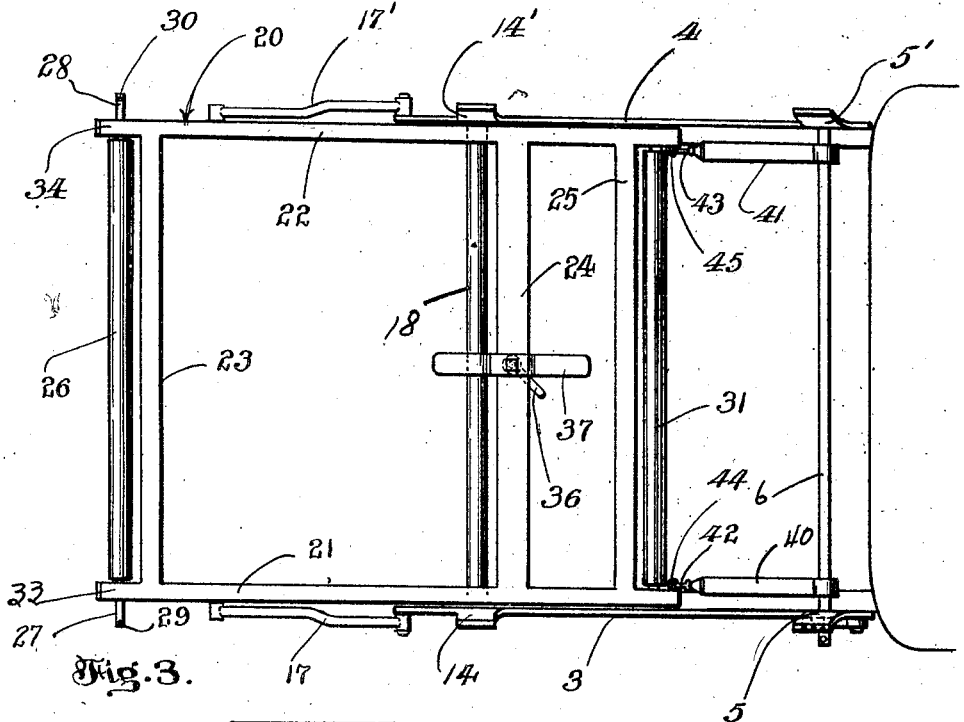
Figure 3 is a plan view of my device, partially disconnected from the automobile to which it is attached, and pulled backward to show the windlass connection.

The numeral 1 indicates the body portion of an automobile, while the numeral 2 represents the wheel of an automobile. On each side of the body portion of the machine the members 3 and 4 are secured. These members are secured to the machine carrying the device by any suitable means such as bolts. The members 3 and 4 are similar in construction hence a description of one will serve as a description of the other, the only difference being that the member 3 is to be secured to the right hand side of the rear portion of an automobile, while the member 4 is to be secured to the left hand side of the rear portion of an automobile. The member 3 has a main portion extending approximately from the rear portion of the seat of the automobile to the extreme rear portion of the body of the automobile.

At the forward portion of the member 3 there is an upstanding and outwardly projecting member 5, which has a cross-shaft 6 mounted therein and rigidly secured to the cross-shaft 6 is a ratchet wheel 7 with which the pawl 8, mounted on the pivot 9, engages. Through the end of the cross-shaft 6 there is secured the pin 10 for engagement with the crank 11.

Slightly rearward from the member 5 there is secured the hinge member 12, which has a slot therein for engagement with the staple 13. When the piano or other article transported by the device is in the position shown in Figure 1 a pin may be inserted thru the staple 13 to hold the device with its load in rigid transport position.

At the rear portion of the member 3 there is another upstanding and outwardly turned member 14, and immediately below this projection there is an elongated and downwardly projecting member 15, which has a bolt 16 mounted in the end thereof, said bolt serving as a pivot for the rod 17.

Extending from the member 14 on the part 3 to the member 14' on the part 4, is a roller 18. Loosely mounted on the above described mechanism and especially resting on the roller 18 is a rectangular platform 20, which consists of the side members 21 and 22, and the cross members 23, 24, and 25. The side members 21 and 22 project rearwardly beyond the cross member 23 and have a roller 26 mounted therein. This roller 26 has ends 27 and 28 projecting for some distance from beyond the outer surface of said side members, and have holes 29 and 30 in said ends to receive suitable pins for pivotally securing the members 17 and 17'. At the forward portion of said members there is secured another roller 31 extending from one side piece to the other.

The medial portions of said side members are cut away on their underneath edge forming an elongated recess 32.

Figure 4:
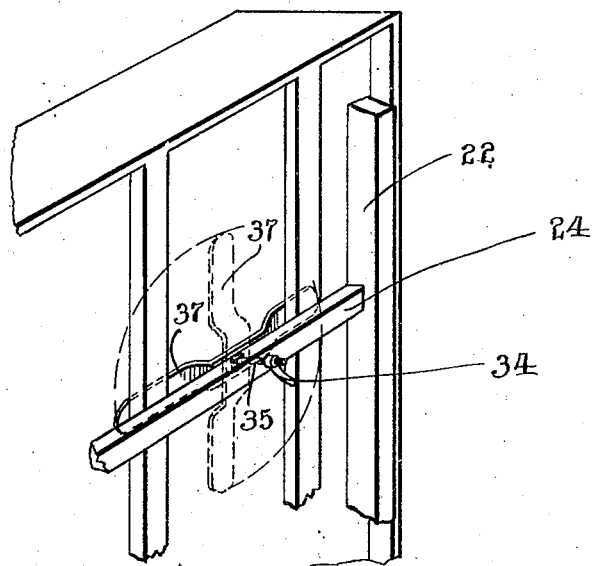
Figure 4 is an enlarged detail view of the means for securing the piano to said device for transporting same.

At the rear ends of the side members 21 and 22 there is secured the upwardly projecting members 33 and 34, which serves to support a piano or other device while it is being loaded, unloaded, or transported. Penetrating the member 24 is a bolt 35 having a thumb-screw 36 on the lower end thereof, and secured to the opposite end of the bolt 35 and on the upper side of the member 24 is a clamping member 37 adapted to engage the frame portion of the piano. When said member 37 is adjusted in position shown in heavy lines in Figure 4 the thumb-screw can be tightened to rigidly hold the clamping member 37 against the frame portion of the piano, which will cause the piano to be rigidly secured to the platform of which 24 is a part thereof.

The cross-rod 6 has flexible members 40 and 41, such as belting or leather straps, secured thereto. These have snaps 42 and 43 on their free ends which are adapted to be engaged in the eyes 44 and 45 in the extreme forward portion of the side members 21 and 22.

The method of operation of my device is as follows:

The platform 20, as above described, is placed on the roller 18, and the arms 17 and 17' are secured to the points 27 and 28. The belt members 40 and 41 are secured to said platform by the snap members 42 and 43. Let us suppose that the device is in the position shown in Figure 1. The pawl 9 is released from the ratchet 6. The crank 11 is applied to the end of the shaft 6 and turned in a counter-clockwise direction. The weight of the rear portion of the piano will cause the rear portion of the device to traverse the path shown by the dotted line 50 in Figure 1, and when the belting is completely unwound the piano will be in the position shown in Figure 2. The clamping means may now be released and the piano carried to any desired point.

In the above described operation the porch 51 is supposed to be non-existent. In many cases it is desired to unload the piano directly onto the porch. In devices of this nature heretofore known and used this has been impossible. In my device the pins may be taken out of the holes 29 and 30, the arms 17 and 17' may then be removed from the projections 27 and 28. The crank 11 will be turned for a few revolutions and the belting strips 40 and 41 will be unsnapped from the forward portion of the platform. The platform carrying the piano is now entirely free from the automobile and may be rolled on the rollers 26 and 31 onto the porch and to any desired portion of the house of which the porch may be a portion thereof.

The method of unloading above described may be reversed for loading.

Having thus described my invention fully, what I desire to protect and secure by Letters Patent is:

1. In a device of the class described, members secured to the rear portion of an automobile, roller means mounted in said members, a platform having rollers on the lower side thereof and mounted on said members, said platform adapted to receive and hold a piano for transportation, and means mounted on the said members for moving the platform from unloading position to transport position.

2. In a device for transporting pianos, members secured to each side of the rear portion of an automobile, said members having upwardly projecting members integral therewith, a roller mounted in the rearmost upwardly projecting member, a windlass mounted in the foremost upwardly projecting member, arms projecting from said first-named members, a platform equipped with rollers resting on the roller mounted in the rearmost upwardly projecting members, said platform being connected to the windlass by flexible means, a member pivoted on the first named member and also pivoted to the rearmost portion of the platform.

3. In a device of the kind described, a rectangular frame secured to the rear portion of a motor vehicle, a roller extending across the frame, downwardly extending arms secured to the rear portion of the frame, a windlass secured in the front portion of the frame, a second frame adapted to rest normally on the first frame, pivoted arms secured to the second frame, and also secured to the downwardly extending arms secured to the first frame, flexible strips of material secured at one end to the windlass and having the other end secured to the second frame, the second frame being adapted to receive articles for transportation, and also adapted to slide on the first mentioned frame.

In testimony that I claim the foregoing as my own I hereby affix my signature this the 27th day of March 1925.

BERL C. SNYDER.